United States Patent

[11] 3,626,054

[72] Inventor Richard O. Ores
Leonia, N.J.
[21] Appl. No. 677,868
[22] Filed Oct. 25, 1967
[45] Patented Dec. 7, 1971
[73] Assignee Bard-Hamilton Company, Inc.
East Paterson, N.J.

[54] LUPUS ERYTHEMATOSUS SKIN TEST
3 Claims, No Drawings
[52] U.S. Cl..................................... 424/9,
424/12
[51] Int. Cl.................................... G01n 31/00,
G01n 33/16
[50] Field of Search......................... 424/9, 12

[56] References Cited
OTHER REFERENCES
Ores et al., Am. J. Med. Sci., 248 (5) 562–566 (1964)
Deicher et al., J. Exp. Med. 109 (1) 97–114 (1959)

Remingtons Pharmaceutical Sciences, Mack Pub. Co., Easton, Pa. (1965), pp. 368–369
Handbook of Chemistry and Physics, Chem. Rubber Pub. Co., Cleveland, Ohio (1962), p. 1721

Primary Examiner—Albert T. Meyers
Assistant Examiner—Anna P. Fagelson
Attorneys—Fidelman, Wolffe & Leitner and Morris Fidelman ABSTRACT: The invention pertains to an aqueous intradermal injection composition containing deoxyribonucleic acid and 0.36–0.7 percent of alkali metal chloride and a buffer, preferably a phosphate buffer. The pH is in the range of 6.9–8. Intradermal injection of the composition evokes induration encircled by erythema at the area surrounding the injection site on persons suffering from systemic lupus erythematosus. The deoxyribonucleic acid may be sterilized by contact with ethylene oxide prior to preparation of the aqueous composition.

LUPUS ERYTHEMATOSUS SKIN TEST

This invention is that of a skin test preparation containing a stable aqueous injectable solution of deoxyribonucleic acid for use in diagnosis of systemic lupus erythematosus in untreated subjects, that is to say, subjects not under systemic medication. Systemic lupus erythematosus often is called "Systemic Lupus" or "SLE." Deoxyribonucleic acid (sometimes called desoxyribonucleic) usually is abbreviated DNA. The skin test preparation of the invention is said to be stable because it has a shelf life without noticeable loss of activity of the DNA in the aqueous vehicle in the presence of the other ingredients dissolved in it, for over a year and yet manifests effective activity even after 2 years, to permit its effective diagnostic use without provoking undesirable reaction in the subject tested.

The invention also is that of the method of testing an untreated subject showing suspicious symptoms, to determine whether the subject has systemic lupus or SLE.

SLE, the generalized disease, which attacks the kidneys, and also the heart and other organs, is known to cause a wide variety of symptoms, such as pain and inflammation of the joints, skin rash, and various changes throughout the system, all too often is not recognized but instead its symptoms lead to the impression that some other ailment is involved.

Thus, heretofore there developed unfortunately the very extended in time and all too costly so-called Lupus Erythematosus cell test, briefly called the "LE-cell test" as the so-called "mainstay for the diagnosis of SLE." That test is described fully by Dr. Edmund L. Dubois on pages 302–306 of a review entitled "Lupus Erythematosus" edited by him, published by The Blakiston Division, McGraw-Hill Book Company, New York, N.Y.

In this investigation resulting in the diagnostic preparation and skin test method of this invention, prior to 1965 there was prepared for parenteral use a 0.1 percent solution of DNA in aqueous saline by dissolving 100 milligrams (that is, mg.) of DNA in 5 milliliters (that is, ml.) of 0.1 Normal (that is, N) sodium hydroxide solution, then adding distilled water to bring the volume to 50 ml. followed by sufficient 0.1 N hydrochloric acid to adjust to pH 7.4 and then distilled water to bring the volume to 100 ml.

That parenteral preparation manifested undesirable limitations. For example, among other shortcomings, that earlier preparation could not be sterilized suitably because it evidenced loss of its DNA activity on filter sterilization, e.g. by Seitz filter. It could not be sterilized by heat because of loss of its DNA activity, or by often used chemical solutions, or even by ultraviolet exposure.

Then too, its general use was all too seriously restricted by its inducing on injection not only an undue burning sensation but also an itchy and intolerably painful reaction at the injection site. Sometimes the reaction was so intense that necrosis developed in the center of the site.

Unfortunately, such preparation including physiological saline could not be used because it adversely affects the reactivity of the DNA, for example, by depressing the extent of induration that should form around the injection side and the accompanying erythema, both of which should occur in a known positive SLE subject.

All of those limitation, shortcomings and disadvantages of that preparation made earlier in this development are overcome and avoided by the improved diagnostic preparation and method of this invention.

A feature of the preparation and method of the invention is its provision of a simple and readily useable preparation that enables its wide and general application as a skin test indicated to be more sensitive in the diagnosis of untreated systemic lupus erythematosus than the earlier available very costly and time consuming LE-cell test.

Another feature of the preparation of the invention is the ease with which it is prepared and sterilized, together with its stability as manifested by its earlier above-described shelf life.

A further feature of the invention is its provision of such an injectable preparation which can be injected so widely without burning sensation, painful or other undesirable reaction.

Yet another feature of the invention is that it is generally widely applicable to enable ruling out all subjects suspected by their symptoms of having SLE when in fact, they have some other ailment, the symptoms of which are like those manifested by SLE.

Broadly considered, the diagnostic preparation of the invention comprises a diagnostically effective concentration of DNA stably dissolved in an aqueous vehicle wherein also is dissolved a physiologically acceptable buffer, compatible with the dissolved DNA, to maintain the pH at from about 6.9 to about 8, and from about 0.2 to about 0.5 percent of an alkali metal chloride physiologically acceptable when a skin-test-effective volume of the preparation is injected into the subject.

The content of the DNA can be as low as about 0.05 percent to about 0.12 percent or more, as up to about 0.3 percent or more. Actually, any amount above 0.1 percent ordinarily is unnecessary at the customary 0.1 ml. injection volume, so that any excess merely is wasted.

The alkali metal chloride advantageously is sodium chloride, and can vary within the above recited range and optimally be used at about 0.3 percent.

So far as presently observed, the buffer may vary qualitatively and quantitatively so long as it serves to maintain the pH within the above recited range, better yet between 6.9 and 7.5, and beneficially at about pH 7.3 plus or minus 0.1. Advantageously, the buffer can consist essentially of potassium dihydrogen phosphate ($KH_2PO_4$) to the extent of about 0.036 percent of the aqueous skin test preparation, disodium hydrogen phosphate dodeca-hydrate ($Na_2HPO_4 \cdot H_2O$) at about 0.143 percent, and the alkali metal chloride as sodium chloride at about 0.3 percent. Citric acid or sodium citrate, or sodium or potassium acetate, or other such physiologically acceptable buffers can be used along with the alkali metal halide, as well as mixtures of any of them in suitable proportions to maintain the desired pH value within the above recited range; so long as such other buffer is compatible with (i.e. will not precipitate and so inactivate) the DNA. That can be determined by simple test to see if the DNA is precipitated, or by checking a solution by intradermal test on a known untreated SLE subject.

While so far as presently indicated DNA from calf's thymus is advantageously effective, a suitable purity of DNA from any other bovine or mammalian source can be used, as well as also from yeast, fish sperm such as herring or salmon sperm, or other suitable quality source.

Whatever the source of the DNA, it is beneficial first to sterilize it by exposing it in powder form to ethylene oxide gas in a suitable chamber as used for a time sufficient for the particular charge of DNA for such sterilization. Ordinarily 4 to 8 hours may be sufficient. There is no disadvantage in allowing the exposure to run longer. Then, the DNA should be aerated by exposure to an atmosphere of sterile air, by feeding such air into the chamber for a sufficient time substantially to displace the ethylene oxide by escape through the usual outlet for that. That too can be carried out for 8 to 12 hours and with no disadvantage by allowing it to continue overnight for 24 hours.

Advantageously, the required amount of the buffer composition including its alkali metal chloride such as sodium chloride can be dissolved in a convenient amount of pyrogen-free sterile distilled or demineralized water, or in nonsterile such water which resulting solution (with or without the phenol) can be sterilized as by Seitz filtration, autoclaving, or both.

The DNA, for example, 1.0 gram, is dissolved in sufficient volume of known concentration, e.g. 25 ml. of 0.1 N, sodium hydroxide, the resulting solution to a convenient volume, such as 250 ml., and adjusted to about pH 7.4 with the required volume of known concentration, conveniently 0.1 N, hydrochloric acid. To that solution then can be added the buffer in a quantity to provide its required concentration in the final preparation; and the pH checked and, if necessary, adjusted to pH 7.4.

The phenol (e.g. 4 grams) then can be added, or the solution further diluted with the same water to nearly the required volume and the phenol then added and the volume finally brought to one liter. The phenol need be present only to the minimum extent for the final solution to remain bactericidal, as 0.4 percent per liter of finished preparation.

The method of the invention involves testing a human subject to see whether the subject is carrying SLE, by (i) injecting intracutaneously at a clear, namely, readily readable area on the body, for example, into the (first suitably aseptically cleaned) skin of the ventral surface of the forearm, 0.1 ml. of the injectable DNA skin test preparation, (ii) observing the test site after 8, 12 and 24 hours to evaluate it as negative or positive, and as to the latter, to grade it at a specific one of three ratings.

If in a period up to 24 hours, there occurs no reaction at all, or only slight redness confined in area to the original injection site, the test is negative. A positive reaction is shown at the injection site by an area of induration as large or larger than the original wheal following withdrawal of the needle, surrounded by a halo of erythema. The positive reaction is rated 1 plus when the width of the halo measured radially from the wheal is from 1 to 10 millimeters (that is, mm.). The reaction is 2 plus when the halo width exceeds 10 and is up to 20 mm., and the reaction is 3 plus when the halo width exceeds 20 mm.

The DNA skin test preparation for SLE of the invention, is illustrated by, but not restricted to, the following example:

| | | |
|---|---|---|
| Deoxyribonucleic acid | 1.0 | gram, |
| Potassium dihydrogen phosphate | 0.36 | gram, |
| Disodium hydrogen phosphate ($12H_2$), | 1.43 | grams, |
| Sodium chloride | 5.0 | grams, and |
| Phenol (U.S.P.) | 4.0 | grams |

The ethylene oxide sterilized DNA was dissolved as described at page 5 lines 16–22. The potassium dihydrogen phosphate, disodium hydrogen phosphate, and the sodium chloride were dissolved in pyrogen-free sterile distilled water, their solution then sterilized by autoclaving (or other method), and added to the as there diluted DNA solution; the phenol then was added as described at page 5 lines 23–28, and the solution then was diluted to the final volume of one liter. The resulting finished sterile aqueous skin test preparation then contained:

| | | |
|---|---|---|
| Deoxyribonucleic acid | 0.1 | percent, |
| Sodium chloride | 0.3 | percent, |
| Potassium dihydrogen phosphate | 0.036 | percent, |
| Disodium hydrogen phosphate ($12H_4O$) | 0.143 | percent, and |
| Phenol | 0.4 | percent. |

That finished skin test preparation then was filled into sterile rubber capped vial of two different sizes holding 2 ml. and 5 ml. each respectively; and in that form was ready for sale and use in making the skin test. That was done by aseptic withdrawal of the commonly used for injection 0.1 ml. volume of the test solution for intracutaneous injection as earlier above-described.

The various constituents of the example can be varied quantitatively so long as the DNA is present in a diagnostically effective concentration, and the buffer with the sodium chloride are present in an amount to provide the disclosed range of content for (a) the alkali metal chloride and (b) the solids provided in the preparation by the buffer composition along with the alkali metal chloride in the range of from about 0.36 to about 0.7 percent by weight.

The specific disodium hydrogen phosphate used can be replaced with any of its other forms such as the one having only two or seven molecules of water of crystallization. Either of the two different phosphates in the buffer can be replaced by a correspondingly equivalent amount of any other similarly physiologically acceptable, water-soluble monovalent alkali cation dihydrogen, or di-monovalent alkali cation monohydrogen, phosphate.

Phenol is not the only bactericidal agent to be used, for it can be replaced in whole or in part by a corresponding bactericidally sufficient concentration of any other bactericidal agent used in preparations to be injected and compatible with the DNA in their respectively used concentrations.

By "diagnostically effective concentration" is meant the minimum concentration which, when administered intradermally injected in a suitable injection volume, for example, the so commonly used 0.1 ml. can give at least a herein defined 1 plus rating positive test in a subject known to have systemic lupus erythematosus. Thus, it could be possible to inject from 0.05 to about 0.3 ml. of the diagnostic preparation of the invention although the 0.1 ml. volume of an injectable as so commonly used generally is enough.

All of the percentages expressed in this disclosure are by weight unless otherwise stated. The term "injectable" applied to the diagnostic preparation of the invention sets forth that the complete preparation is pyrogen-free and sterile so as to be suitable for injection.

These diagnostic preparations are applicable primarily with human subjects.

What is claimed is:

1. In the method of testing for systemic lupus erythematosus, which method comprises aseptically intradermally injecting into a suitable site on a human subject a diagnostically effective amount of an aqueous injectable preparation containing deoxyribonucleic acid in a concentration sufficient to provoke a positive skin test in a human subject suffering from systemic lupus erythematosus, said preparation also containing sodium chloride, a person having systemic lupus erythematosus thereafter developing induration encircled by erythema in the area surrounding the injection site, the improvement which comprises buffering said preparation with a physiologically acceptable phosphate buffer compatible with the deoxyribonucleic acid to provide with sodium chloride from about 0.36 to about 0.7 percent solids in said preparation, the sodium chloride content being from about 0.2 to about 0.5 percent in said preparation and the pH of said preparation being from about 6.9 to about 8.

2. The method of claim 1 wherein said phosphate buffer comprises potassium dihydrogen phosphate and disodium phosphate.

3. The method of claim 1 wherein said aqueous preparation contains therein by weight percent:
about 0.1 of deoxyribonucleic acid
about 0.3 of sodium chloride
about 0.036 of potassium dihydrogen phosphate, and
about 0.143 of disodium hydrogen phosphate ($12H_2O$).

* * * * *